United States Patent [19]

Sticht

[11] Patent Number: 4,819,784

[45] Date of Patent: Apr. 11, 1989

[54] ARRANGEMENT FOR FEEDING PARTS

[75] Inventor: Walter Sticht, Attnang-Puchheim, Austria

[73] Assignee: STIWA-Fertigungstechnik Sticht Gesellschaft m.b.H., Attnang-Puchheim, Austria

[21] Appl. No.: 103,131

[22] Filed: Sep. 17, 1987

Related U.S. Application Data

[60] Continuation of Ser. No. 808,230, Dec. 12, 1985, abandoned, Division of Ser. No. 540,900, Oct. 11, 1983, abandoned.

[30] Foreign Application Priority Data

Oct. 25, 1982 [AT] Austria .................. 3901/82

[51] Int. Cl.⁴ .............................................. B65G 43/08
[52] U.S. Cl. ..................... 198/395; 198/396; 209/939
[58] Field of Search ............... 198/395, 396, 398, 399, 198/400, 356; 221/159, 160, 161; 209/587, 598, 939; 358/101; 382/8, 34, 44, 50; 250/223 R; 901/47

[56] References Cited

U.S. PATENT DOCUMENTS

| 2,967,497 | 1/1961 | Braun et al. | 198/395 X |
|---|---|---|---|
| 3,034,633 | 5/1962 | Clifford et al. | 198/398 |
| 3,224,553 | 12/1965 | Campbell | 221/161 |
| 3,282,397 | 11/1966 | Grunwald | 198/395 X |
| 3,392,816 | 7/1968 | Cox | 198/398 X |
| 3,759,418 | 9/1973 | Willson et al. | 198/398 |
| 3,910,407 | 10/1975 | Sterling | 198/356 |
| 3,955,678 | 5/1976 | Moyer | 198/356 X |
| 3,983,388 | 9/1976 | Gugliotta | 209/587 X |
| 4,099,609 | 7/1978 | Kieronski et al. | 198/395 |
| 4,144,566 | 11/1979 | Peyton et al. | 209/939 X |
| 4,233,625 | 11/1980 | Altman | 382/8 |
| 4,509,646 | 4/1985 | Eitzinger | 198/398 |
| 4,530,430 | 7/1985 | Peterlini | 198/395 |

FOREIGN PATENT DOCUMENTS

| 858330 | 12/1970 | Canada | 198/399 |
|---|---|---|---|
| 2430691 | 6/1975 | Fed. Rep. of Germany | 198/395 |
| 3033686 | 4/1981 | Fed. Rep. of Germany | |
| 2492785 | 4/1982 | France | 198/395 |
| 722016 | 1/1955 | United Kingdom | 221/159 |

Primary Examiner—Robert J. Spar
Assistant Examiner—Cheryl L. Gastineau
Attorney, Agent, or Firm—Kurt Kelman

[57] ABSTRACT

An arrangement for feeding parts, which comprises a storage bin for the parts, a conveyor for moving the parts from the storage bin in a feeding direction, apparatus for orienting the moving parts arranged rearwardly of the conveyor in the feeding direction and comprising different conveyor paths, and a distributor associated with the orienting apparatus, the distributor including a transfer device capable of assuming respective positions cooperating with respective ones of the conveyor paths, a drive for imparting the respective transfer positions to the transfer device, a control for the drive, and a monitor ascertaining characteristic data of the parts and transmitting the data to the control whereby the transfer device is driven into a respective one of the transfer positions in response to the data.

5 Claims, 3 Drawing Sheets

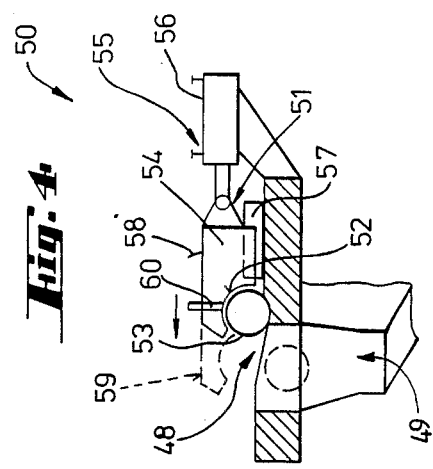
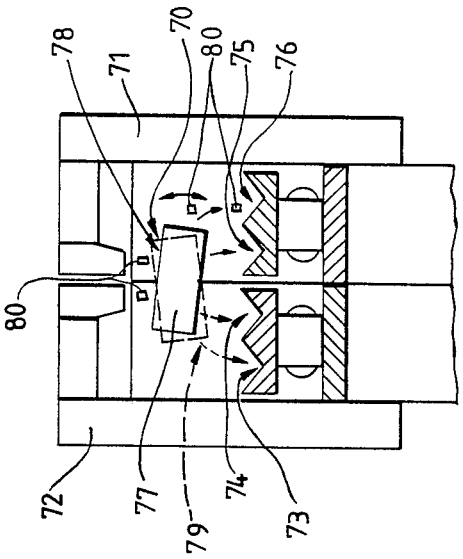
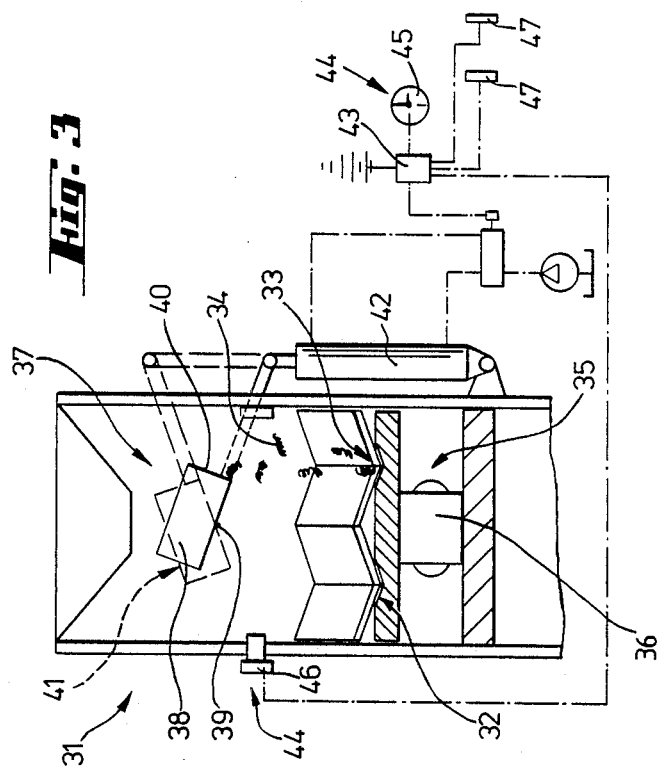
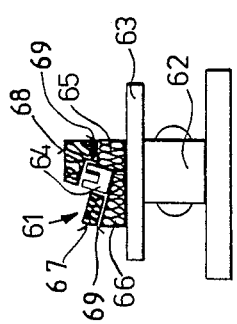

ARRANGEMENT FOR FEEDING PARTS

This is a continuation of my U.S. Pat. application Ser. No. 808,230, filed Dec. 12, 1985, now abandoned, which is a division of my application Ser. No. 540,900, filed Oct. 11, 1983, now abandoned.

BACKGROUND OF THE INVENTION (1) Field of the invention

The present invention relates to an arrangement for feeding parts, which comprises a storage bin for the parts, a conveyor means for moving the parts from the storage bin in a feeding direction, means for orienting the moving parts arranged downstream of the conveyor means in the feeding direction and, if desired, means for singling the oriented parts downstream of the orienting means. Such arrangements are particularly useful in assembly or packaging apparatus.

(2) Related prior art

Such an arrangement is known, for example, from Published German Patent Application No. 3,033,686. A means for ascertaining the position of the parts is arranged in the conveyor path of the pre-oriented parts and, depending on the ascertained position of each part, a position changing device is operated to put the part in a predetermined, desired position. The repositioned parts are then fed to an assembly apparatus. The output capacity of this parts feeding arrangement is limited by the time required for the operation of the parts position changing device, which must reposition each part to impart to it the desired position. When considerable numbers of parts must be fed to an assembly or packaging machine, for example, several feeding arrangements are often arranged in parallel to provide the required numbers of oriented parts.

SUMMARY OF THE INVENTION

It is the primary object of this invention to provide an arrangement and method for feeding parts having several orders of orientation, in which the capaqcity of each conveyor path for conveying and orienting the parts into a predetermined, desired position is fully utilized, to orient the parts in several orders of orientation during their conveyance without interrupting their feeding.

In the indicated arrangement, the above and other objects are accomplished according to one aspect of the present invention with an orienting means comprising different conveyor paths, and a distributing means associated with the orienting means, the distributing means including transfer means capable of assuming respective positions cooperation with respective ones of the conveyor paths, a drive for imparting the respective transfer positions to the transfer means, a control for the drive, and monitoring means ascertaining characteristic data of the parts and transmitting the data to the control whereby the transfer means is driven into a respective one of the transfer positions in response to the data.

In a parts feeding arrangement of this type, this invention provides a method of orienting the parts, which comprises the steps of removing a randomly arranged portion of the parts by the conveyor means to the orienting means, orienting the parts according to an order of orientation, ascertaining the position of the parts and comparing the ascertained position with a selected position, and transferring the parts to a respective one of the conveyor paths in dependence on the position of the parts.

In this unexpectedly simple manner, each conveyor path may be utilized to its maximum capacity and the data characterizing the conveyance and/or the parts may be taken into account for this maximum utilization of the conveyor paths. Only parts sharing these characteristic data will reach the assembly or packing station and preceding buffer zones will not be blocked by parts which do not conform thereto.

BRIEF DESCRIPTION OF THE DRAWING

The above and other objects, advantages and features of the invention will become more apparent from the following detailed description of certain now preferred embodiments thereof, taken in conjunction with the generally schematic drawing wherein

FIG. 3 is a similar, enlarged view of another embodiment of the distributing means;

FIG. 4 is an end view, partly in section, of a conveyor part and a distributing means associated therewith;

FIG. 5 is a similar view showing an embodiment with synthetic resin guide elements;

FIG. 6 is an end view, partly in section, of a parts feeding arrangement with two mirror-symmetrically arranged conveyor means and a distributing means disposed therebetween;

DETAILED DESCRIPTION OF PREFERRED EMBODIMENTS

Figures 1, 2:
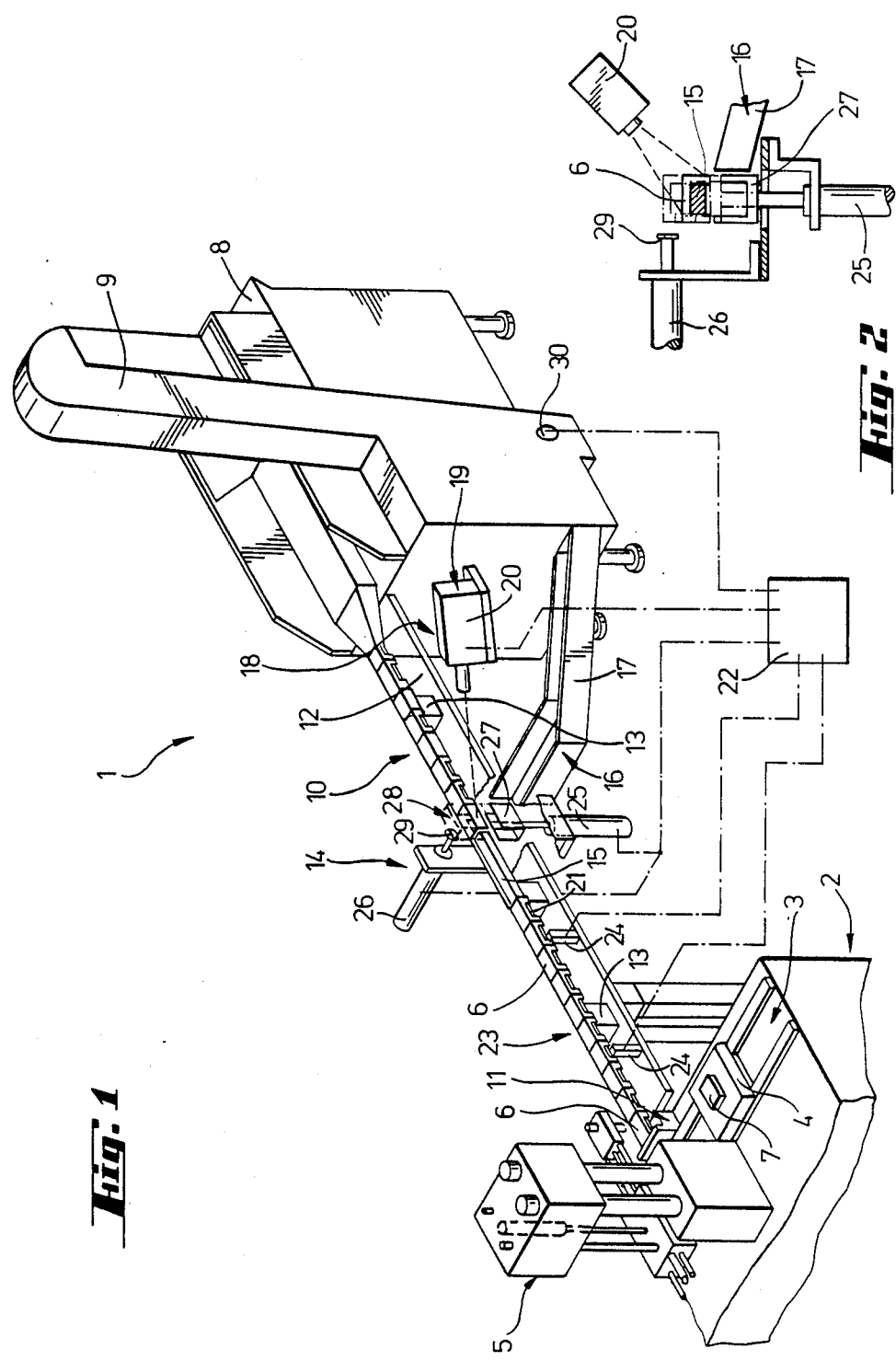
FIG. 1 is a perspective view of an arrangement for feeding parts according to the present invention and associated with an assembly machine.
FIG. 2 is an end view, partly in section, of the distributing means of the arrangement of FIG. 1.

Referring now to the drawing and first to FIG. 1, there is shown arrangement 1 for feeding parts to assembly machine 2. Pallet 4 carrying workpiece 7 is slidably mounted on guide track 3 of assembly machine 2. The pallet is held in position in the range of manipulating mechanism 5 of the machine to enable part 6 fed to the machine by arrangement 1 to be assembled with workpiece 7. Arrangement 1 for feeding parts 6 comprises storage bin 8 for the parts, conveyor means 9 for moving the parts from the storage bin in a feeding direction, means 10 for orienting the moving parts arranged downstream of the conveyor means in the feeding direction, and means 11 for singling oriented parts 6.

Parts orienting means 10 comprises linear conveyor 12 which is vibrated by vibrating drive 13 and, according to this invention, distributing means 14 is associated with the orienting means along its path. Orienting means 10 comprises different conveyor paths, one conveyor path 15 being constituted by a guide ledge of linear conveyor 12 configurated to receive and guide parts 6 while another conveyor path 16 is constituted by chute 17 connected to storage bin 8 for returning parts thereto.

Illustrated distributing means 14 includes transfer means 27 capable of assuming respective positions cooperating with respective ones of conveyor paths 15, 16 and drive 25 for imparting the respective transfer positions to the transfer means. Control 22 is connected to the drive and monitoring means 18 ascertaining characteristics data of parts 6 transmits the data to control 22 whereby transfer means 27 is driven into a respective one of the transfer positions in response to the data.

In the illustrated embodiment, monitoring means 18 comprises monitoring device 19 ascertaining the position of parts 6 and having an output transmitting corresponding output signals to control 22, as indicated by a signal transmission line shown in chain-dotted lines. The illustrated monitoring device is television camera 20. Parts 6 fed to singling means 11 at the end of linear conveyor 12 of the orienting means must have a certain position to be capable of being singled. In the illustrated embodiment, the parts define transverse recess 21 extending in a direction perpendicular to the feeding direction when the parts are in the desired position. This recess is turned towards television camera 20 so that the camera may ascertain this position. As shown in broken lines, the sighting line of the camera is directed towards distributing means 14 to ascertain the position of respective parts 6 passing therethrough. Depending on the position of a respective part, television camera 20 will transmit different output signals corresonding to the position of the sighted part to control 22. When the part has the desired position, i.e. when the camera sights recess 21 in part 6, the part will pass unhindered through distributing means 14 along one of the conveyor paths, i.e. guide ledge 15, and proceed along buffer zone 23 of vibratory conveyor 12 to singling means 11. The buffer zone is delimited by two indicators 24, 24 at respective ends of the zone, the indicators having outputs transmitting signals to control 22 when the buffer zone is filled with parts, as indicated by chain-dotted signal transmission lines. If a part has the wrong orientation when it passes through the sighting line of television camera 20, as shown in FIG. 1, the output signal from the camera indicates this to control 22. As shown in chain-dotted lines, the control is connected to drive 25 operating deflecting device 27 constituting the transfer means (see also FIG. 2). In this manner, the deflecting device will be driven in a respective one 28 of the transfer positions (see broken lines) cooperating with conveyor path 16 when the ascertained position deviates from the desired position. At the same time, drive 26, which is also connected to control 22, will drive ejector 29 of the deflecting device of distributing means 14 to push misoriented part 6, which has been lifted by deflecting device 27 off guide ledge 15, into chute 17. The chute will return the part to storage bin 8. In this manner, those parts which have not been properly oriented in orienting means 10 will be automatically ejected and recycled without in any way interfering with the further feeding of oriented parts. The use of a television camera as monitoring means has the advantage that is merely needs to ascertain two positions, which the camera can do with high dependability, quickly and without high costs, eliminating any special means for assuring the continued feeding of properly oriented parts.

When buffer zone 23 is filled with parts, indicator 24 will transmit a signal to control 22 to operate drives 25, 26 in the same manner as when a misoriented part is sensed so that the parts passing through distributing means 14 will be deflected into chute 17 and back to the storage bin, thus avoiding jamming of conveyor 12 back to conveyor means 9. As shown by a chain-dotted line, control 22 is also connected to drive 30 for conveyor means 9 so that the drive may be de-energized and the operation of the conveyor means halted when indicator 24 transmits a signal to the control indicating that the buffer zone is filled with parts. In this manner, further feeding will be discontinued until drive 30 is energized again on cessation of a signal from control 22.

If desired, conveyor path 15 may be constituted by a succession of several independently operable vibratory conveyors to enable, for example, the orienting conveyor immediately preceding buffer zone 22 to be deactivated when the buffer zone is filled with parts.

While a television camera is a very useful monitoring device ascertaining the position of the parts, other electro-optical devices may be used for this purpose, such as scanning cameras capable of sensing the outer dimensions or the position of the parts.

In the embodiment of FIG. 3, the orienting means of arrangement 31 for feeding parts 34 comprises two parallel conveyor paths 32, 33. At least a portion of the conveyor paths extend along linear conveyor 35 vibrated by vibrating drive 36. Distributing means 37 is associated with the orienting means to assure the distribution of a certain number of parts 34 to each conveyor path. The transfer means of this distributing means is device 38 tiltable about axis 39 extending substantially parallel to the feeding directon to assume the respective transfer positions and arranged between the conveyor means and conveyor paths 32, 33, the conveyor paths being substantially parallel to the feeding direction for orienting parts 34 in that direction. Depending on the tilt 40 or 41 of device 38, indicated in full and broken lines, the conveyor means will feed the parts to one or the other conveyor path. For pivoting tiltable gate 38, the same is connected to drive 42, for example a pneumatic jack linked to the tiltable gate. As shown by chain-dotted lines, control 43 has an output connected to a valve controlling the air delivery from a compressed air container to the respective cylinder chambers of jack 42 and an input connected to monitoring means 44 whereby tiltable gate 38 is driven into respective transfer position 40, 41 in response to the data transmitted by the monitoring means. The monitoring means may comprise time measuring instrument 45 transmitting a control signal to control 43 at adjustable time intervals so that the gate will be tilted at such intervals, or instrument 46 measuring the amount or number of parts 34 fed through gate 38 to conveyor paths 32, 33. Furthermore, in a manner more fully described hereinabove, drive 42 may also be operated by control 43 when the latter receives a signal from indicators 47 delimiting a buffer zone to indicate that the latter is filled with parts. In this manner, gate 38 will be tilted to feed the conveyor path 32 or 33 whose buffer zone is not yet filled. This arrangement makes sure that the two parallel conveyor paths are substantially equally charged as parts are delivered thereto from the storage bin by the conveyor means.

FIG. 4 shows an embodiment wherein the orienting means comprises conveyor paths 48 and 49. Distributing means 50 is arranged in the range of these conveyor paths and monitoring means 51 comprises monitoring device 52 constituted by a gauge ascertaining the outer dimensions of parts 53. Gauge 52 is adjustably slidable transversely of the feeding direction and constitutes deflecting device 55 for transferring parts 53 either to conveyor path 48 or 49. For this purpose, the gauge is constituted by slide 54 connected to drive 56 capable of moving the slide along guide track 57 transversely to the conveyor paths between position 58 (shown in full lines) and positon 59 (shown in broken lines) cooperating respectively with conveyor path 48 and 49. The gauge face facing part 53 has sensor 60 which is arranged to determine that an outsized part is jammed in the gauge or that no part has passed for some time, which presumably means that an outsized part is jammed upstream of the sensor - in which case the sensor transmits a corresponding signal to the control of drive 56, causing the same to move into position 59. In this manner, outsized parts are automatically ejected into conveyor path 49, which is a chute, and only correctly sized parts pass through gauge 52 to conveyor path 48. With this arrangement, no special manipulating device is required to assure that misoriented or outsized parts are ejected and only those parts pass in the feeding direction which meet the data set by the gauge.

FIG. 5 illustrates linear conveyor 63 vibrated by vibrating drive 62 and defining conveyor path 61 for parts 64 to be oriented. Guide elements 65, 66 for the parts are comprised of synthetic resin, for example rigid polyvinyl chloride. However, while the guide elements may be made of PVC plates, they may also consist of synthetic resin foam material. In this case, guide elements 65, 66 may be foamed integrally with their carrier plate. Such conveyor materials will reduce the operating noise of the vibratory conveyor and have the added advantage that they may be readily shaped to any desired form. If polyurethane forming a hard integral foam is used for this purpose, a rigid, load-bearing surface will be formed during foaming, and this produces a wear-resistant structural sandwich element in conjuction with a lighter core. Guide elements of synthetic resin forming baffle plates for the parts to be oriented can be readily worked and connected to parts arranged thereon. For example, it may be useful to bond abutments 67 and/or deflectors 68 for parts 64 to guide elements 65 and/or 66 by means of adhesive 69 to produce desirable orientatation to parts 64. If tests indicate that such abutments and/or deflectors fail to serve their desired purpose, they may be readily removed from the guide elements and rearranged by reshaping the guide elements and/or bonding the abutments and/or deflectors to the guide elements in different configurations. Such synthetic resin guide elements for the conveyor path make it possible to convey and orient very delicate parts, such as contacts and the like coated with noble metals, without damaging the parts. Also, such elements have an increased service life and provide a better gliding surface for the oriented parts. When they are shaped into baffle plates for special purposes, abutments and/or deflectors may be simply arranged on the guide element base by bonding, and such bonded abutments and/or deflectors may be readily removed and rearranged. This saves a great deal of time in the manufacture and makes it possible to adapt the arrangement for feeding new parts whose form requires different baffle means for orientation. Afterwards, blueprints may be prepared from the synthetic resin blanks for making metal guides.

In the embodiment of FIG. 6, distributing means 70 precedes conveyor paths 73–76 and conveyor means 71, 72 preceding the distributing means comprises two mirror-symmetrically arranged conveyors for parts 80. As in the embodiment of FIG. 3, the distributing means is comprised of tiltable gate 77 which may be driven into respective discharge portions 78 and 79 shown in full and broken lines, respectively. If the gate is continuously rocked back and forth, it will evenly distribute parts 80 coming from conveyors 71 and 72 over conveyor paths 73–76, as shown in the drawing. Of course, it is possible to control the pivoting of tiltable gate 77 so that it achieves different positions designed to feed parts 80 to selected ones of the conveyor paths. The control of the gate drive (not shown in FIG. 6) may be like that of the embodiment of FIG. 3 and may be responsive, if desired, to a monitored amount of parts fed to the respective conveyor paths and/or to set time intervals. This arrangement assures a high feeding rate of properly oriented parts even if a relatively high number of undesirably oriented and/or sized parts are rejected and returned to the storage bin.

Figure 7:
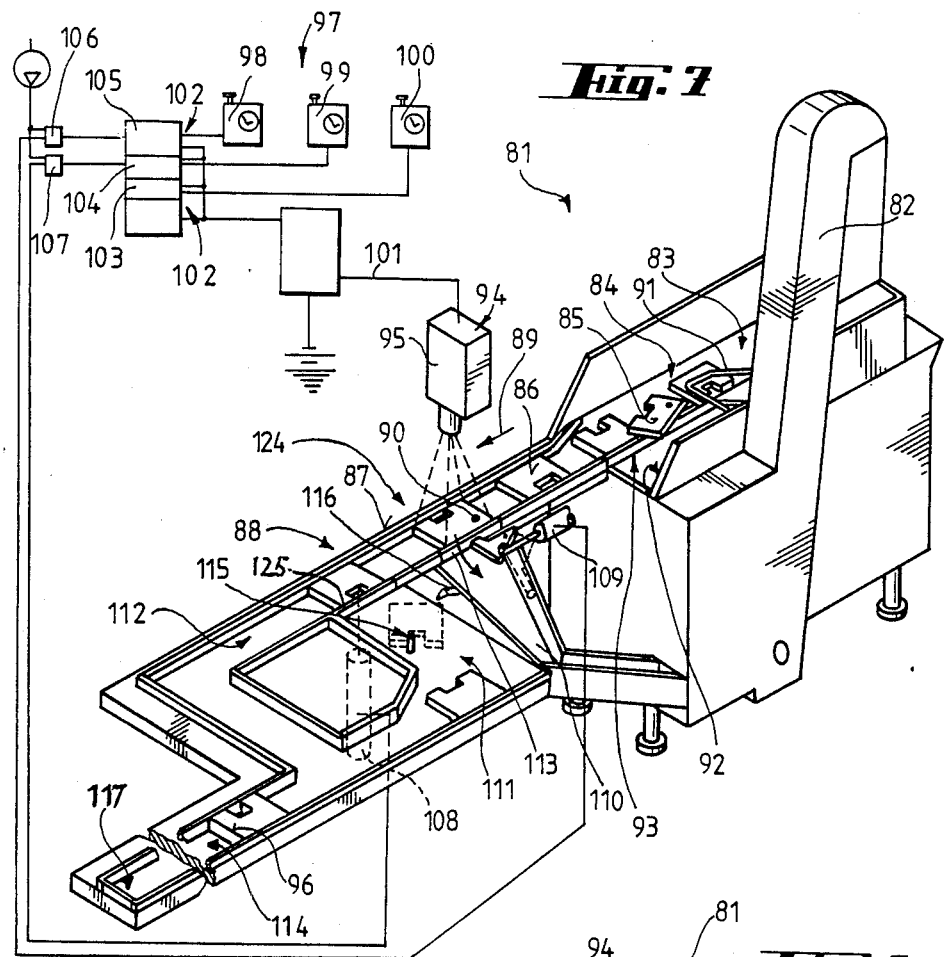
FIG. 7 is a perspective view similar to that of FIG. 1 and showing another embodiment of the distributing means.

FIG. 7 illustrates arrangement 81 for feeding parts 84, which comprises conveyor means 82, for example as described in Published German Patent Application No. 3,135,581. Pre-orientation baffle 83 is arranged at the output end of the conveyor means and is so directed or aligned with respect to the configuration of parts 84 that the parts assume a stable position, i.e. that the parts are supported on linear conveyor 88 of the orienting means on one of their side faces 85 or 86 against baffle plate 87 of the linear conveyor. The linear conveyor may be vibrated by magnetic vibrators or other suitable vibrating drives to move parts 84 in a feeding direction indicated by arrow 89. Side face 85 of parts 84 contains bore 90. Deflector 91 is arranged in the range of pre-orientation baffle 83 for properly aligning the parts with respect to baffle plate 87. Ejector 93 is mounted on linear conveyor 88 above storage bin 92 so that, as schematically shown in the drawing, any part 84 superposed on another part is caught by the ejector and drops back into the storage bin. The ejector is a balancing web over which parts 84 are guided by deflector 91 and whose height corresponds approximately to the thickness of the parts so that parts lying above the web glide down into storage bin 92. If the parts are so configurated that they may be entangled, calipers or other additional ejector means may be installed to prevent entangled parts from passing out of the pre-orienting baffle 83. The parts reaching linear orienting conveyor 88 pass parts orientation monitoring means 94 constituted in the illustrated embodiment by television camera 95.

As the simplified operating example illustrated in FIG. 7 shows, the actual orientation of parts 84 may deviate from the desired orientation of the parts, as shown at 96, up to two degrees of order. Therefore, three signal transmitters 98, 99, 100 are associated with control 97 for drives 108 and 109 for imparting the respective transfer positions to transfer means directing parts 84 respectively into conveyor paths 110, 111 and 112, each transmitter having an output, and each one of the signal transmitters being set for one of the three possible actual orientations of parts 84 and transmitting a corresponding output signal. Output 101 of monitoring device 94, i.e. the television camera, transmits a signal corresponding to the actual orientation of a respective part 84, to inputs 102 of comparators 103, 104, 105, respectively, which are also connected to the outputs of signal transmitters 98, 99, 100. The comparators have outputs which are charged when the output signals transmitted by monitoring device 94 and by signal transmitters 98–100 to inputs 102 of comparators 103–105 conform, i.e. when the orientation of a part ascertained by the television camera is the same as that set in a signal transmitter. The outputs of the comparators are connected to controls 106, 107 for drives 108, 109 associated with transfer means of distributing means 124 for different conveyor paths 110, 111 and 112. Conveyor path 110 is a chute extending from parts orientation monitoring device 94 back to storage bin 92 for recycling misoriented parts. When the monitoring device ascertains that a part has an incorrect orientation, i.e. face 85 containing bore 90 faces the monitoring device, which corresponds to the orienation set in signal transmitter 98, the charged output of comparator 105 will energize control 106 for drive 109. The illustrated transfer means driven by drive 109 is trap door 113 pivoted into its open position by drive 109 so that the incorrectly oriented part is transferred into chute 110. When the output signal of monitoring device 94 conforms to that of signal transmitter 99, the output of comparator 104 is charged and energizes control 107 for drive 108. These output signals correspond in the illustrated example to an orientation of part 84 wherein a recess in the part faces away from baffle plate 87 of the linear orienting conveyor. Drive 108 then lowers a gate 125 so that the incorrectly oriented part 84 is transferred to by-pass conveyor path 111 which leads to buffer zone 114. Correctly oriented parts 96 are fed through conveyor path 112 to buffer zone 114 when the output signals from monitoring device 94 and the signal transmitter 100, wherein the correct orientation is set, conform and the gate 125 is in its raised position. If desired, the charged output of comparator 103, to which the latter output signals are transmitted, may operate registering or other devices. As indicated in broken lines, fixed post 115 may be arranged in by-pass conveyor path 111 for turning part 84 about a vertical axis in a horizontal plane to reverse its orientation so that, as shown in full lines, the parts will be fed into buffer zone 114 in their correct orientation, with the recess of the part facing baffle plate 87. Nozzle 116 emitting an air blast may be mounted in the range of the post 115 to assist the turning of the parts.

This arrangement has the advantage that only those parts 84 are fed to discharge station 117 which need be oriented only with respect to one or two degrees of order. If their orientation required several manipulations or if the time is longer than that desired for sequentially removing the parts at the discharge station, the parts are rejected and returned to the storage bin through chute 110. With complex parts having a plurality of orders of orientation, this arrangement rapidly ascertains whether any part has an orientation enabling it to be oriented subsequently, for example by mechanical baffles or the like, into a desired orientation or whether the part should be removed because its orientation deviates from the desired orientation by a plurality of orders of orientation. This makes it possible to do with a simple baffle at the outlet of the conveyor means, for instance a flat plate with a simple abutment, for imparting to a plurality of conveyed parts a stable position conforming to their configuration. The parts orientation monitoring device will then ascertain the degree of order reached by the parts as they pass the device. The monitored orientation so controls the distributing means, i.e. the drives of its transfer means, that each part is fed only to such an orienting means, for example a balancing web, a deflecting baffle or a position reversing baffle, as is required to orient the part in the desired orientation. It is also possible to reject all parts which have only a very low degree of order without further orientation and to recycle such parts to the storage bin. This optimizes the throughput of the parts feeding arrangement and also enables it to be retrofitted for different parts.

Figure 8:
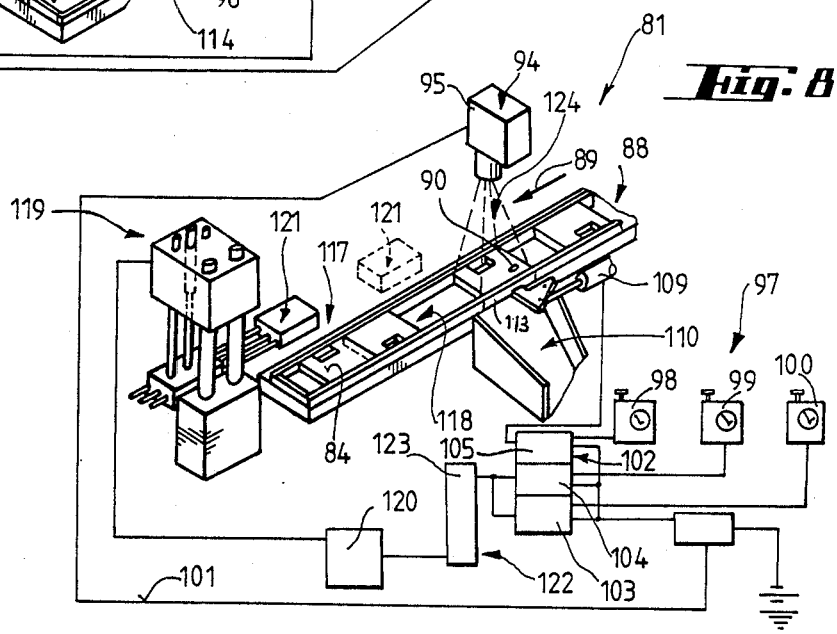
FIG. 8 is a fragmentary view of an arrangement according to FIG. 7 but comprising a modified distributing means and control, including a manipulatig device for repositioning the parts into a desired position.

In modified arrangement 81 for feeding parts 84 illustrated in FIG. 8, like components operating in a like manner are designated by the same reference numerals as in FIG. 7. Linear orienting conveyor 88 comprises conveyor path 110, as described in FIG. 7, and conveyor path 118 downstream of monitoring device 94. This embodiment further comprises manipulating device 119 including control unit 120 for operating gripper 121 of the manipulating device arranged at the discharge station of the conveyor. The output of of monitoring device 94 is connected to control unit 120 and the operating movement of the manipulating device gripper is controlled in response to the output signals of signal transmitters 98, 99, 100. While the output of comparator 105 is connected to drive 109, as in the embodiment of FIG. 7, the outputs of comparators 103 and 104 are connected to storing device 122 constituted by shifting register 123 arranged to retain the data charcteristic of the position of the parts. The output of the shifting register is connected to control unit 120 for manipulating device 119. In this manner, the operating movement of the manipulating device is controlled in response to the characteristic data retained in shifting register 123.

When a part 84 passes monitoring device 94 and its orientation corresponds to that set in signal transmitter 98, the part is transferred to conveyor path 110. If such a part has the orientation set in signal transmitters 99 and 100, it will pass unhindered to conveyor path 118. The actual orientations of the parts ascertained by monitoring device 94 are signaled by associated comparators 103 and 104 to shifting register 123 where the signals are retained, the register having at least as many memory devices as the number of parts 84 finding room between monitoring device 94 and manipulating device 119. In this manner, the actual orientation of each part 84 arriving at the manipulating device is signaled to control unit 120 and the movements of manipulating device gripper 121 are programmed so that the control unit will operate the same in response to the stored signals to orientation the part in a desired manner.

In this embodiment, a conveyor path 118 serves as the buffer zone and, even if a succession of incorrrectly oriented parts pass within view of monitoring device 94 and are ejected through chute 110, parts will be continuously fed to the manipulating device and any assembly or packaging machine following this device. The manipulating device may be a suitable robot or any other useful parts manipulator designed in a very simple and controlled manner to impart to each part a missing order of orientation so that it will be positioned correctly as it reaches the assembly or packaging machine. The storing device retaining the data characteristics of the orientation of a series of parts enables the conveyor path ahead of the manipulating device to be used as a bufrer zone storing a plurality of parts for sequential manipulation by device 119. This has the advantage that a plurality of incorrectly oriented parts may be stored on the orienting conveyor while maintaining the timing of the handling of the parts by the manipulating device. The manipulating device is operated in response to signals corresponding to the actual orientations of the parts to re-orient incorrectly oriented parts accordingly, thus simplifying the orienting baffles and/or eliminating the need for fixed orienting devices along the conveyor path and requiring less space for the orienting means.

The outputs of the comparators are connected to respective ones of the transfer means drives associated with respective ones of the different conveyor paths, and one conveyor path, i.e. chute 110, is connected to the storage bin. By thus selecting the conveyor path to which each part is transferred, it is possible to subject only those parts to further orientation which do not have the desired order of orientation. Those parts which happen to have this order of orientation after pre-orientation pass unhindered to the end or discharge station. This further enhances the throughput of the arrangement.

If the timing of the assembly machine or packaging machine to which the oriented parts are fed is such that substantial intervals of time may lapse between successive parts needed by the machine, the manipulating device may be arranged immediately downstream of position monitoring device 94 (as indicated by manipulating device gripper 121 shown in broken lines). But in this arrangement time will also be saved because of the provision of conveyor path 110 associated with monitoring device 94.

The distributing means of the invention and the components associated therewith may have any suitable structure. However, it is essential that it includes a monitoring means of the hereinabove-described function, more particularly a monitoring device which ascertains the orientation of the part and, in response to the signaled orientation, either controls ejection of the part and, preferably, recycles it to the storage bin or controls transfer of the part to parts orienting devices downstream.

The conveyor means also may be of any suitable structure. For example, if parts which may be entangled, such as spiral springs, are to be conveyed, a turbulence or whirl chamber may be arranged in the range of pre-orientation baffle 83 between ejector 93 and storage bin 92 so that entangled parts may be disentangled and the disentangled parts may be recycled to conveyor means 82. Furthermore, conveyor means 82 may be constituted by a magnetic band arranged below a metallic gliding surface so that the individual parts are magnetically removed from storage bin 92 and conveyed upwardly. In this case, it is advantageous to arrange a demagnetizing device, such as an annular A.C. coil, between the discharge end of the conveyor means and pre-orientation baffle 83 so that the parts pass therethrough and any residual magnetism is removed from the parts to separate the parts from each other.

The monitoring means used in the parts feeding arrangement of the present invention also may take any suitable form functioning in a manner equivalent to the one disclosed herein by way of example. Thus, in addition to a television camera, it is possible to use line scanning cameras, light arrays, devices with movable sensors using laser or ultrasonic beams, or any type of electrical or electro-optical means for sensing characteristic data of the parts without contacting them and while they are conveyed. The signal storing device may be any useful memory device, such as a microprocessor. The conveyor means, the orienting means including its guide baffles and any disentangling means needed for disentangling entangled parts may take the form disclosed in my U.S. Pat. Nos. 4,588,069, 4,275,976, 4,231,687 or 4,396,108.

The use of the monitoring means in the arrangement of this invention makes it possible to utilize simple, for example L-shaped, baffles in the range of pre-orientation baffle 83. If one leg of such an L-shaped baffle is adjustable perpendicularly to the guide surface for the parts, the width of the guide path may be readily adapted to parts of different size. With an ejector arranged above the guide path, a universal adaptation to different thicknesses of the parts may be obtained if the ejector is vertically adjustable. In this manner, the parts feeding arrangement may be rapidly adapted to different series of parts and the arrangement can be cheaply adapted to universal use.

With the arrangement of the invention, a randomly arranged portion of the parts are removed from the storage bin, the randomly arranged portion of the parts is moved by the conveyor means to the orienting means, the parts are oriented according to an order of orientation, the orientation of the parts in this order of orienation is ascertained and compared with a selected orientation, and the parts are transferred to a respective one of the conveyor paths in dependence on the orientation of the parts. The orientation of the parts is preferably sensed without contact with the parts and while the parts are continuously conveyed. Preferably, the parts whose ascertained orientation does not correspond to the selected orientation are returned to the storage bin while the other parts are transferred to at least one different conveyor path in dependence on the deviation of their orientation from a desired orientation. This parts orienting method has the advantage that even parts whose complex shape makes it impossible to orient them with fixed mechanical elements may be readily oriented in a simple manner. Such a method is particularly useful for square or like configurated parts defining identical recesses and/or bores, which are difficult to orient with fixed orienting elements.

It is possible to transfer the other parts to the different conveyor paths by fixed orienting elements and to direct the other parts through a buffer zone to a manipulating device controlled by the monitoring means. Signals corresponding to the ascertained orientation of the other parts are stored until the manipulating device has corrected the orientation of the other parts, and the stored signals are then extinguished. In this manner, it is possible readily to distinguish between parts which may be oriented into the desired orientation within an acceptable time interval and those whose proper orientation would take too long. Since the latter parts are returned to the storage bin, those parts removed from the desired orientation by several orders of orientation will not interfere with the feeding of the acceptable parts.

Since the actual orientation of the parts is constantly monitored and compared with the desired orientation, and the comparison signals control the movements of the manipulating device, these movements are reduced to a minimum, thus saving much time in the transfer of the properly oriented parts from the parts feeding arrangement to an assembly or packaging machine. The oriented parts being stored in the buffer zone assure a steady supply of parts even if there is some interruption upstream. If entangled or superimposed parts are removed between the conveyor and monitoring means, the proper functioning of the monitoring means with respect to ascertaining the position of each part will be assured.

What is claimed is:

1. An arrangement for feeding parts having a number of orders of orientation, which comprises
   (a) a storage bin for the parts, (b) a conveyor means for moving the parts from the storage bin in a feeding direction, (c) means for singling the moving parts and for pre-orienting the singled parts to assume more than two possible orders of orientation while returning the moving parts which have not been singled to the storage bin, said singling and pre-orienting means being arranged downstream of the conveyor means in the feeding direction, (d) further conveyor means for moving the singled, pre-oriented parts in the feeding direction, said further conveyor means comprising
  (1) at least two conveyor paths leading to a discharge station and
  (2) another conveyor path leading back to the storage bin, (e) a single distributing means for the singled, pre-oriented parts between the pre-orienting means and the conveyor paths of the further conveyor means for distributing each one of the singled, pre-oriented parts to a selected one of the conveyor paths in dependence on a respective order of orientation of said part, the distributing means including
  (1) respective transfer means capable of assuming transfer positions for distributing each part to the selected conveyor path,
  (2) a drive for each one of the transfer means for imparting a respective transfer position to the respective transfer means,
  (3) a control for each one of the drives,
  (4) a monitoring device ascertaining characteristic data indicating the respective one of more than two orders of orientation of each part and emitting more than two output signals respectively corresponding to the respective order or orientation of each part, and
  (5) comparator means for simultaneously receiving and comparing the output signals from the monitoring device and more than two additional signals indicating selected characteristic orientation data indicating the respective order of orientation of each part either for return thereof to the conveyor path leading to the storage bin or for distribution to one of the conveyor paths leading to the discharge station, and for transmitting output signals to the drive controls when the output signals from the monitoring device and the additional signals conform, a respective one of the transfer means being driven in response to the output signals from the comparator means to return the part to the conveyor path leading to the storage bin or to distribute the part to a respective one of the conveyor paths leading to the discharge station, and (f) further orienting means in at least one of the conveyor paths leading to the discharge station.

2. The parts feeding arrangement of claim 1, wherein the transfer means comprises a tiltable gate arranged at an input end of each conveyor path and assuming an open transfer position when the control for said gate receives an output signal from the comparator means.

3. The parts feeding arrangement of claim 1, wherein the monitoring device is a television camera.

4. The parts feeding arrangement of claim 3, wherein the comparator means comprises a like number of signal transmitters as the number of orders of orientation of the pre-oriented parts, each signal transmitter emitting a respective one of the additional signals, a like number of comparators as the number of orders of orientation of the pre-oriented parts, each comparator having inputs receiving a respective one of the output signals of the television camera and the additional signals from the signal transmitters.

5. The parts feeding arrangement of claim 1, wherein the further orienting means comprises a fixed element in one of the conveyor paths for orienting the parts in said one conveyor path.

* * * * *